Aug. 13, 1929.  R. H. FINLEY  1,724,081
AIR SPEED AND COURSE INDICATOR AND RECORDER FOR AIRCRAFT
Filed April 11, 1923
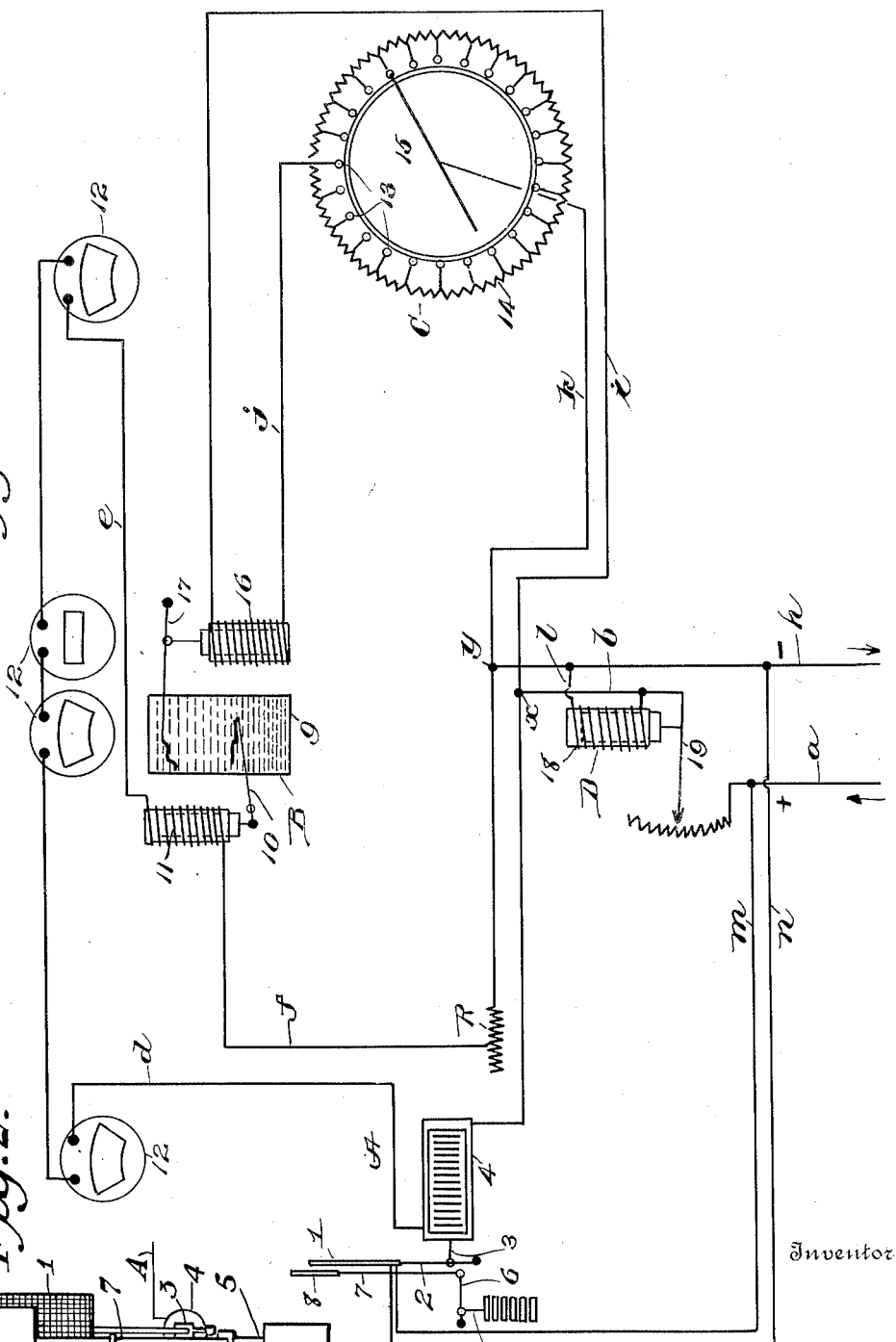
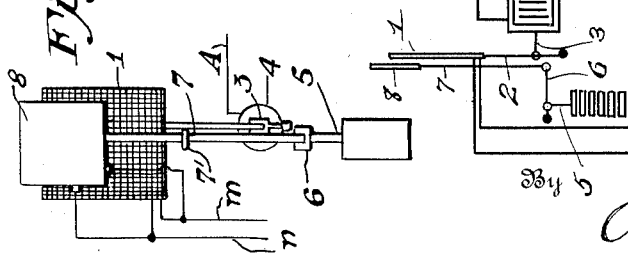

Patented Aug. 13, 1929.

1,724,081

UNITED STATES PATENT OFFICE.

ROBERT H. FINLEY, OF NEW HAVEN, CONNECTICUT.

AIR SPEED AND COURSE INDICATOR AND RECORDER FOR AIRCRAFT.

Application filed April 11, 1923. Serial No. 631,333.

This invention relates to airspeed and course indicators and recorders for aircraft, the object in view being to provide apparatus to accurately and continuously measure airspeed, indicate the value thereof on one or more instrument locations at various points or stations on the craft, and make a permanent record of such speed.

In the accompanying drawings:

Fig. 1 is a diagrammatic view of the apparatus; and

Fig. 2 is a front elevation illustrating the pressure screen and shield used with this invention.

A designates a pressure screen and carbon pile assembly. The pressure screen 1 may be made of fine mesh bronze wire screening of one sixteenth (more or less) in mesh and may be electrically heated as shown to prevent formation of frost or ice thereon or the accumulation of snow or mist in inclement weather. The screen 1 is to be placed in such position that it will encounter air undisturbed by any portion of the craft.

Air pressure against the screen 1 is transmitted through lever 2 and linkage 3 to the carbon pile resistance unit 4, the resistance of which varies inversely with the pressure applied.

In conjunction with the pressure screen 1, I employ an altitude compensator which may consist of a series of airtight, corrugated chambers similar to barograph pressure chambers, connected by link 5, lever 6 to the stem 7 that is slidable in the guide means 7'. On the upper end of the stem 7 is a compensator shield 8, serving to cover more or less of the pressure screen 1 to compensate for variation in air density whether due to barometric change or change of altitude.

B represents a recorder, which may consist of a motor (such as clock work) driven drum 9 carrying a calibrated record sheet over which moves a stylus 10 operated by an electromagnet or solenoid 11 in series with the carbon pile 4 and one or more indicating ammeters 12 graduated in miles per hour. Upon such record sheet is preserved a permanent record of the air speed of the craft in miles per hour.

A compass C with contact mechanism embodying a circular series of contacts 13 of a resistance 14 and a contact arm 15, which moves in accordance with bearing changes in the course of the craft, is in circuit with an electromagnet or solenoid 16 controlling a stylus 17 which moves over the aforesaid record sheet on drum 9 and traces a permanent record of the craft's heading or course.

A voltage regulator D enables a current of constant voltage to pass along both the air speed circuit and the compass circuit. Any type of voltage regulator may be used for this purpose, the diagram showing an electro-magnet or solenoid 18 and a conductor arm 19 controlled thereby. The current may be supplied by the electrical system of the craft or by an independent generator.

The operation of the apparatus will now be described. Once the apparatus is installed on the craft, the voltage adjusted to proper value by any suitable means on the voltage regulator, the air speed indicators brought to zero by varying the resistance R, and the styluses of the recorder correctly set, it should not be necessary to make further adjustments, unless periodic inspection shows a fault. Pressure against the carbon pile 4, brought about by pressure screen 1, causes variation in its resistance and thereby varies the current flow through solenoid 11 and the several indications 12, the solenoid causing the stylus 10 to move to the proper place on the record sheet on the drum 9, thus tracing a permanent record of the air speed.

The making of permanent records of the airspeed and ship's heading is perhaps the greatest feature of value of the apparatus. The navigator has a constant check on the helmsman and has complete data always before him from which to work out his dead reckoning position. The permanent record of air speed can best be integrated in sections corresponding to various ship headings, using a planimeter; the air distances thus obtained would be used in plotting the dead reckoning position. Additional indicators calibrated in miles per hour can be put into the circuit at any time and located in any part of the craft. By careful and proper design, speeds as low as three miles per hour may be indicated and recorded, a very important feature in airship work. The shield 8 may be heated as well as the pressure screen 1 if found advisable.

The several circuits may be now traced. Current from a source of electrical energy such as a direct current motor or the craft's electrical system enters on wire *a* and passes along arm 19, wire *b* to post *x*, through wire *c*, carbon pile 4, wire *d*, instruments 12, (wired in series) wire *e*, solenoid 11, wire *f*, resistance R, wire *g*, post *y*, and out through wire *h*, while another portion of the current heats the pressure responsive screen 1 and the shield 8 through the outgoing current carrying wire *m* and return wire *n*.

I claim:

1. In combination, in an air speed indicating device, an air pressure responsive screen adapted to be exposed to the air stream, means movable to shield a portion of said screen, and means for moving said shielding means to vary the amount of said screen to be exposed to said air stream when air density varies.

2. In combination, in an air speed indicating device, an air pressure responsive screen adapted to be exposed to the air stream, means movable to shield a portion of said screen, and barometrical means for moving said shielding means to vary the amount of said screen to be exposed to said air stream inversely as the barometric pressure varies.

3. In combination, in an air speed indicating device, an air pressure responsive screen adapted to be exposed to the air stream, and means whereby an electric current may be sent through the screen for heating said screen.

In testimony whereof I affix my signature.

ROBERT H. FINLEY.